US007860029B2

(12) United States Patent
Sekine et al.

(10) Patent No.: US 7,860,029 B2
(45) Date of Patent: Dec. 28, 2010

(54) SUBSCRIBER LINE ACCOMMODATION DEVICE AND PACKET FILTERING METHOD

(75) Inventors: Minoru Sekine, Tokyo (JP); So Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 1295 days.

(21) Appl. No.: 11/063,542

(22) Filed: Feb. 24, 2005

(65) Prior Publication Data

US 2005/0204062 A1 Sep. 15, 2005

(30) Foreign Application Priority Data

Feb. 26, 2004 (JP) ............................. 2004-051747

(51) Int. Cl.
*H04L 12/28* (2006.01)
(52) U.S. Cl. ...................................... 370/255; 370/428
(58) Field of Classification Search ................ 370/252, 370/400, 402, 351, 389, 392, 395.54; 455/410
See application file for complete search history.

(56) References Cited

U.S. PATENT DOCUMENTS

| 5,999,536 | A * | 12/1999 | Kawafuji et al. | 370/401 |
| 6,101,182 | A * | 8/2000 | Sistanizadeh et al. | 370/352 |
| 6,256,314 | B1 * | 7/2001 | Rodrig et al. | 370/401 |
| 6,496,484 | B1 * | 12/2002 | Suzuki | 370/254 |
| 6,507,585 | B1 * | 1/2003 | Dobson | 370/420 |
| 6,618,476 | B1 * | 9/2003 | Szeto et al. | 379/198 |
| 6,636,505 | B1 * | 10/2003 | Wang et al. | 370/352 |
| 6,853,637 | B1 * | 2/2005 | Norrell et al. | 370/352 |
| 6,891,887 | B1 * | 5/2005 | Dobson | 375/220 |
| 6,965,302 | B2 * | 11/2005 | Mollenkopf et al. | 370/475 |
| 7,245,619 | B1 * | 7/2007 | Guan et al. | 370/392 |
| 7,281,059 | B2 * | 10/2007 | Ryu et al. | 709/245 |
| 7,286,535 | B2 | 10/2007 | Ishikawa et al. | |
| 2002/0194367 | A1 * | 12/2002 | Nakamura et al. | 709/238 |
| 2003/0142864 | A1 | 7/2003 | Bezryadin | |

(Continued)

FOREIGN PATENT DOCUMENTS

CN     1275867 A     12/2000

(Continued)

OTHER PUBLICATIONS

M. Patrick, Jan. 2001, IETF, RFC 3046, pp. 1-14.*

(Continued)

*Primary Examiner*—Kwang B Yao
*Assistant Examiner*—Tung Q Tran
(74) *Attorney, Agent, or Firm*—Foley & Lardner LLP (57) ABSTRACT

A subscriber line accommodation device and packet filtering method is provided. In response to a request for acquisition of an IP address from a user terminal, a DHCP server in the subscriber line accommodation device allocates an IP address, registers a set of the allocated IP addresses, a MAC address of the user terminal, and a line number in a DHCP management table. The subscriber line accommodation device sets the registered information in an input filter section as a packet passing condition. Among packets sent from user terminals, the input filter section sends only those packets satisfying registered conditions toward a bridge forwarder and discards those packets not satisfying the conditions. Even when access is attempted by illegally using an IP address, the packet concerned is discarded unless the line number or a MAC address agrees.

13 Claims, 8 Drawing Sheets

U.S. PATENT DOCUMENTS

| | | | |
|---|---|---|---|
| 2004/0034797 A1* | 2/2004 | Becker Hof | 713/201 |
| 2005/0025143 A1* | 2/2005 | Chen et al. | 370/389 |
| 2005/0201406 A1* | 9/2005 | Sekine et al. | 370/432 |
| 2005/0201410 A1* | 9/2005 | Sekine et al. | 370/463 |
| 2005/0204062 A1* | 9/2005 | Sekine et al. | 709/245 |
| 2006/0067321 A1* | 3/2006 | Satou | 370/392 |
| 2006/0109847 A1* | 5/2006 | Satou | 370/389 |
| 2006/0140182 A1* | 6/2006 | Sullivan et al. | 370/389 |
| 2006/0285648 A1* | 12/2006 | Wahl et al. | 379/1.01 |
| 2007/0143841 A1* | 6/2007 | Kurakami et al. | 726/22 |
| 2007/0280149 A1* | 12/2007 | Takahashi et al. | 370/328 |
| 2008/0155657 A1* | 6/2008 | Ogura et al. | 726/3 |
| 2008/0250496 A1* | 10/2008 | Namihira | 726/22 |

FOREIGN PATENT DOCUMENTS

| | | |
|---|---|---|
| CN | 1450785 A | 10/2003 |
| JP | 2000-151627 A | 5/2000 |
| JP | 2002-204246 A | 7/2002 |
| JP | 2003-069604 A | 3/2003 |
| JP | 2003-304278 A | 10/2003 |
| KR | 1997-0004532 A | 1/1997 |
| WO | WO 03/034687 A1 | 4/2003 |

OTHER PUBLICATIONS

Cable Source-Verify and IP Address Security, Jul. 26, 2002, Cisco Systems, Document ID: 20691, pp. 1-12.*

* cited by examiner

DHCP MANAGEMENT TABLE

| IP ADDRESS | MAC ADDRESS | LINE NUMBER | STATE | LEASE REMAINING TIME |
|---|---|---|---|---|
| 192.1.1.5 | 00:30:65:BA:E9:C2 | 3/10 | OFFER | $t_1$ |
| 192.1.1.8 | 00:00:86:14:8C:5F | 3/12 | ALLOCATE | $t_2$ |
| 192.1.1.15 | 00:00:4C:11:22:33 | 5/1 | Expire | $t_3$ |
| | | | | |

SUBSCRIBER LINE ACCOMMODATION DEVICE AND PACKET FILTERING METHOD

BACKGROUND OF THE INVENTION

This invention relates to a subscriber line accommodation device having a DHCP server and a packet filtering method using the device with such a circuit configuration and, more specifically, relates to a subscriber line accommodation device and a packet filtering method each having a function of preventing illegal access.

A subscriber line accommodation device is used for allowing a plurality of user terminals to access a communication network such as the Internet via transmission lines such as telephone lines, coaxial cables, or optical cables. If fixed IP (Internet Protocol) addresses are allocated to the plurality of user terminals in such a subscriber line accommodation device, the following problem arises. Specifically, if a third party succeeds in guessing an IP address allocated to a certain user terminal, the third party can pretend to be another person possessing such a certain user terminal.

A DHCP (Dynamic Host Configuration Protocol) server is a server having a function of temporarily allocating an IP address prepared in advance in response to a request for access to a communication network from a user terminal as a communication terminal. When such a DHCP server is employed, since IP addresses are not fixed on the user terminal side, it becomes easier to prevent third parties from assuming IP addresses. There is also an advantage that when a user terminal such as a computer or an Internet television temporarily accesses the Internet, a connection operation on a user side can be simplified by using the DHCP server. In view of such advantages, DHCP servers are often used on the subscriber line accommodation device side. A bridge has a function of sorting packets based on MAC (Media Access Control) addresses and therefore serves to prevent entry of those packets having nothing to do with a subscriber line accommodation device from a network.

On the other hand, user terminals such as computers and communication cards are respectively assigned MAC addresses as their unique identification data. In response to accesses from respective user terminals, a subscriber line accommodation device using a DHCP server associates MAC addresses of those terminals with IP addresses assigned from the DHCP server and stores correlations there between.

In view of this, there has been proposed a technique where MAC addresses of all user terminals connected to lines accommodated in a subscriber line accommodation device are registered and, when a communication terminal different from any of the registered MAC addresses tries to access a network, this access is rejected to thereby improve the network security (e.g. see JP-A-2002-204246).

According to this proposal, when a user terminal other than user terminals subordinate to the subscriber line accommodation device accesses the subscriber line accommodation device to request acquisition of an IP address, the DHCP server checks whether or not an MAC address thereof is any one of the MAC addresses registered in the subscriber line accommodation device, before allocating the IP address thereto. Since an MAC address is data formed by a 6-octet (48-bit) bit string, guessing it is much more difficult than guessing an IP address. Consequently, illegal accesses by third parties can be prevented more effectively.

In this proposal, however, a third party who has illegally obtained a user terminal such as a notebook personal computer or a communication card subordinate to the subscriber line accommodation device can make the DHCP server allocate an IP address by connecting the obtained user terminal to an access line accommodated in the subscriber line accommodation device. For example, in a CATV (Cable Television) network, a CATV modem is connected to user terminals of respective subscribers' homes via coaxial cables. In such a CATV network, when an illegally obtained user terminal of another person is connected to the coaxial cable on the midway, illegal access is enabled by making the DHCP server allocate an IP address. This also applies to a case where a third party learns an MAC address by a method such as borrowing a user terminal of another person and illegally uses it.

SUMMARY OF THE INVENTION:

It is therefore an object of this invention to provide a subscriber line accommodation device and a packet filtering method that, in response to a request for access to a communication network by a third party who has illegally learned a MAC address of a communication terminal of another person, can reject such an access request.

According to a first aspect of this invention, a subscriber line accommodation device is provided. The subscriber line accommodation device of the first aspect includes a subscriber line termination section that terminates a plurality of subscriber lines individually, and an address information allocating section. When a communication terminal of any of the plurality of subscriber lines terminated by the subscriber line termination section has made a request for acquisition of own-station address information that is given to a packet when performing packet communication, the address information allocating section allocates own-station address information to the communication terminal by limiting a usable time. The subscriber line accommodation device further may also include a filter condition registering section that registers a pair of the own-station address information allocated by the address information allocating section and an identification number of the subscriber line having made the request for acquisition of the own-station address information. The subscriber line accommodation device may also include a packet communication allowing section that allows packet communication only for a packet in which a pair of own-station address information and an identification number agree to the pair thereof registered in the filter condition registering section.

According to a second aspect of this invention, a subscriber line accommodation device is provided. The subscriber line accommodation device of the second aspect includes a subscriber line termination section that terminates a plurality of subscriber lines individually, and an IP address allocating section that, when a communication terminal of any of the plurality of subscriber lines terminated by the subscriber line termination section has made a request for acquisition of an IP address that is given to a packet when performing packet communication, allocates an IP address to the communication terminal by limiting a usable time. The subscriber line accommodation device also includes a filter condition registering section that registers a set of the IP address allocated by the IP address allocating section, an identification number of the subscriber line having made the request for acquisition of the IP address, and a MAC address as unique information of the communication terminal having made the request for acquisition of the IP address. The subscriber line accommodation device may also include a packet communication allowing section that allows packet communication only for a packet in which a set of an IP address, an identification number, and an MAC address agree to the set thereof registered in the filter condition registering section.

According to a third aspect of this invention, a packet filtering method is provided. The packet filtering method of the third aspect includes an address information allocating step wherein when a communication terminal of any of a plurality of subscriber lines has made a request for acquisition of own-station address information that is given to a packet when performing packet communication, the packet filtering method allocates own-station address information to the communication terminal by limiting a usable time. The packet filtering method also includes a filter condition registering step wherein when the address information allocating step has allocated the own-station address information, the packet filtering method registers a pair of the own-station address information and an identification number of the subscriber line having made the request for acquisition of the own-station address information, along with said usable time. The packet filtering method may further include a packet communication allowing step wherein when a packet has arrived, the packet filtering method allows packet communication only for such a packet that agrees to the pair of the own-station address information within the usable time and the identification number of the subscriber line having made the request for acquisition of the own-station address information.

According to a fourth aspect of this invention, a packet filtering method is provided. The packet filtering method of the fourth aspect includes an IP address allocating step wherein when a communication terminal of any of a plurality of subscriber lines has made a request for acquisition of an IP address that is given to a packet when performing packet communication, the packet filtering method allocates an IP address to the communication terminal by limiting a usable time. The packet filtering method also includes a filter condition registering step wherein when the IP address allocating step has allocated the IP address, the packet filtering method registers a set of the IP address, an identification number of the subscriber line having made the request for acquisition of the IP address, and an MAC address as unique information of the communication terminal having made the request for acquisition of the IP address, along with the usable time. The packet filtering method further includes a packet communication allowing step wherein when a packet has arrived, the packet filtering method allows packet communication only for such a packet that agrees to the set of the IP address within the usable time, the identification number, and the MAC address.

DESCRIPTION OF THE PREFERRED EMBODIMENT

<Outline of System>

Figure 1:
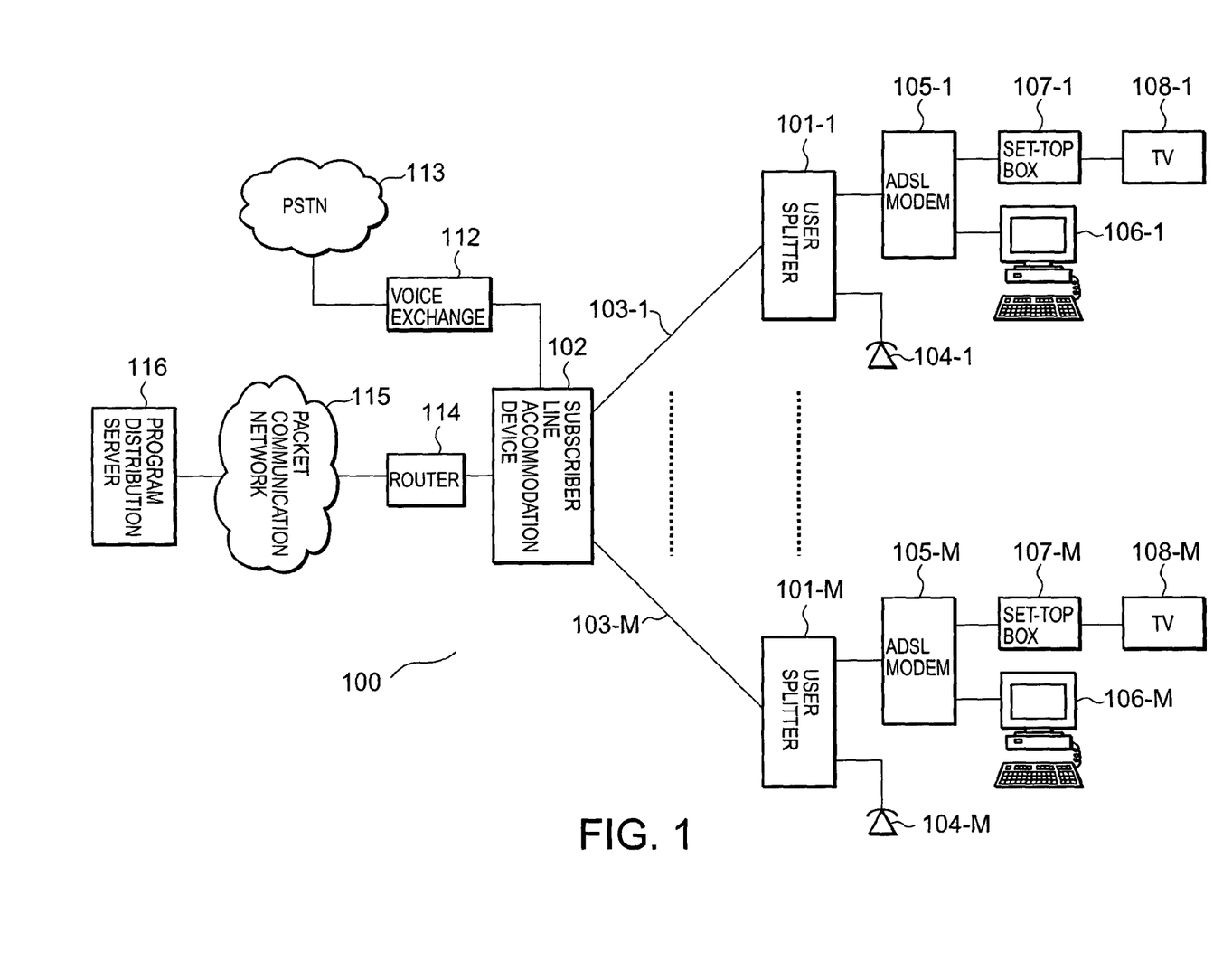
FIG. 1 is a system configuration diagram showing an outline of a multicast information delivery system for seeing and hearing television images and sounds, to which this invention is applied.

FIG. 1 shows an outline of a multicast information delivery system 100 using a subscriber line accommodation device 102 according to a preferred embodiment of this invention. The multicast information delivery system 100 uses an ADSL (Asymmetric Digital Subscriber Line). In the multicast information delivery system 100, user splitters 101-1 to 101-M respectively disposed at subscribers' homes and the subscriber line accommodation device 102 are connected together via DSL subscriber lines 103-1 to 103-M. Telephones 104-1 to 104-M and ADSL modems 105-1 to 105-M are connected to the user splitters 101-1 to 101-M, respectively. Personal computers 106-1 to 106-M that perform various data processing such as homepage browsing are connected to the ADSL modems 105-1 to 105-M, respectively. Further, Internet televisions 108-1 to 108-M for watching television programs are connected to the ADSL modems 105-1 to 105-M via set-top boxes 107-1 to 107-M, respectively.

The subscriber line accommodation device 102 is connected to a voice exchange 112 and thus is adapted to be connected to a PSTN (Public Switched Telephone Network) 113. Further, the subscriber line accommodation device 102 is connected, via a router 114, to a packet communication network 115 such as the Internet for carrying out packet communication. To the packet communication network 115 is connected a program distribution server 116 for distributing various television programs with respect to the Internet televisions 108-1 to 108-M.

Figure 2:
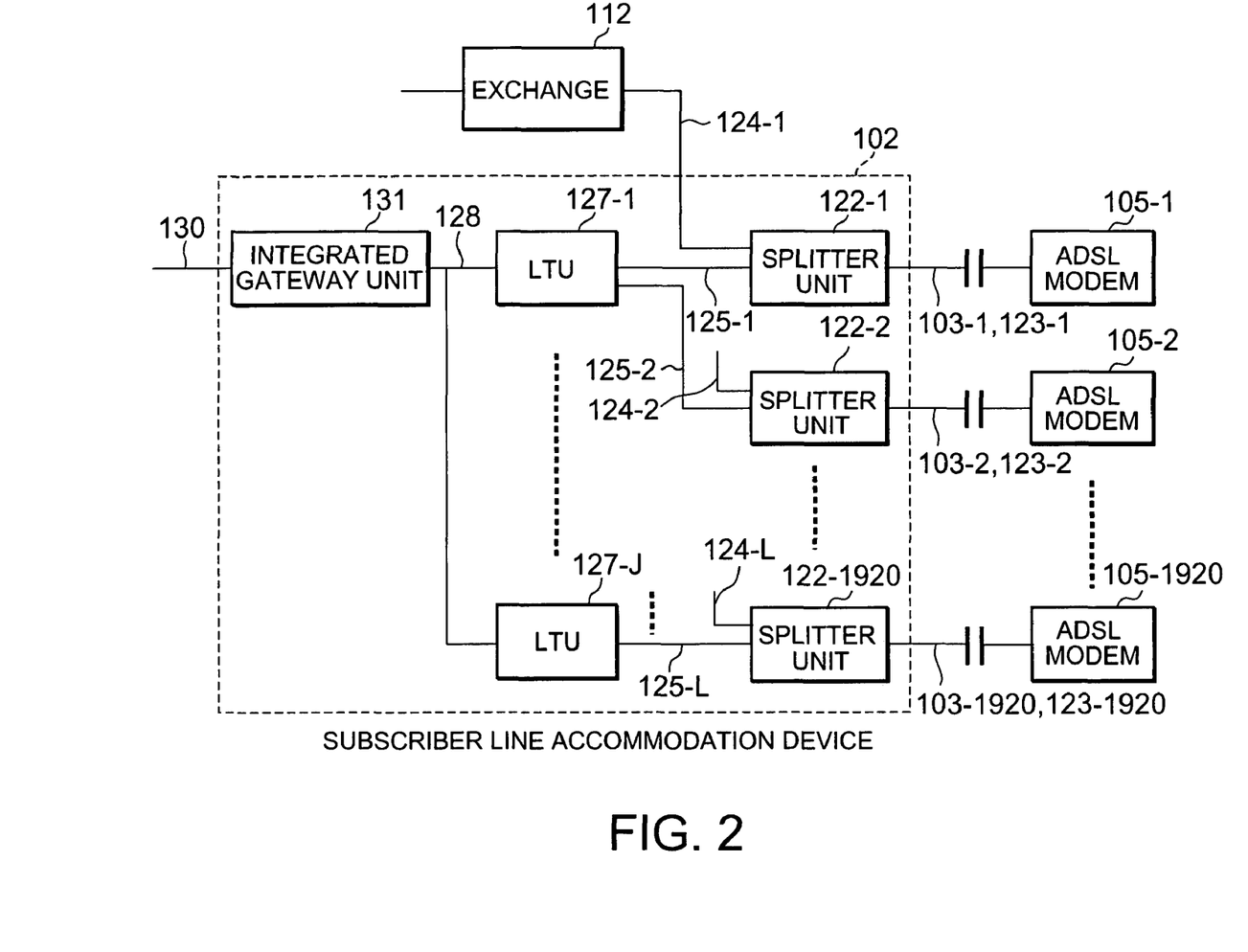
FIG. 2 Is a block diagram showing an outline of a subscriber line accommodation device and its peripheral circuit configuration according to a preferred embodiment of this invention.

FIG. 2 shows a configuration of the subscriber line accommodation device 102 and Its peripheral configuration. The subscriber line accommodation device 102 according to this embodiment has a capacity of 1920 lines at maximum per system.

The subscriber line accommodation device 102 comprises splitter units 122-1 to 122-1920 connected to the ADSL modems 105-1 to 105-1920 via the DSL subscriber lines 103-1 to 103-1920, respectively. Among them, the splitter unit 122-1 will be representatively described. The splitter unit 122-1 splits a signal 123-1 received via the DSL subscriber line 103-1 into a telephone signal 124-1 of a voice frequency band and an ADSL signal 125-1 of a predetermined frequency band higher than the voice frequency band. The telephone signal 124-1 is sent to the voice exchange 112 serving for line switching.

On the other hand, the ADSL signal 126-1 split by the splitter unit 122-1 is modulated/demodulated at an initial stage (not illustrated) of a corresponding DSL subscriber line termination unit (hereinafter referred to as "LTU") 127-1 among LTUs 127-1 to 127-J so that ATM cells are extracted. The extracted ATM cells are input into an integrated gateway unit (IGU) 131 via a backplane bus 128, Details of the Integrated gateway unit 131 will be described later. Like the splitter unit 122-1, the splitter units 122-2 to 122-1920 respectively split signals 123-2 to 123-1920 received via DSL subscriber lines 103-2 to 103-1920 into telephone signals 124-2 to 124-L of the voice frequency band and ADSL signals 125-2 to 125-L.

Each of the LTUs 127-1 to 127-J comprises a DSL transceiver module corresponding to a predetermined number of lines (e.g. 32 lines at maximum). The DSL transceiver module is formed by a later-described DSP (Digital Signal Processor). Each of the LTUs 127-1 to 127-J performs high-speed data communication in an uplink direction via an uplink line 130 serving as an interface for connection to the Internet, by the use of the corresponding lines among the DSL subscriber lines 103-1 to 103-1920, while receives and modulates downlink data and sends the modulated downlink data to the corresponding lines among the DSL subscriber lines 103-1 to 103-1920. Note that the uplink direction is a direction toward the packet communication network 115 in FIG. 1, while a downlink direction is opposite to the uplink direction.

Figure 3:
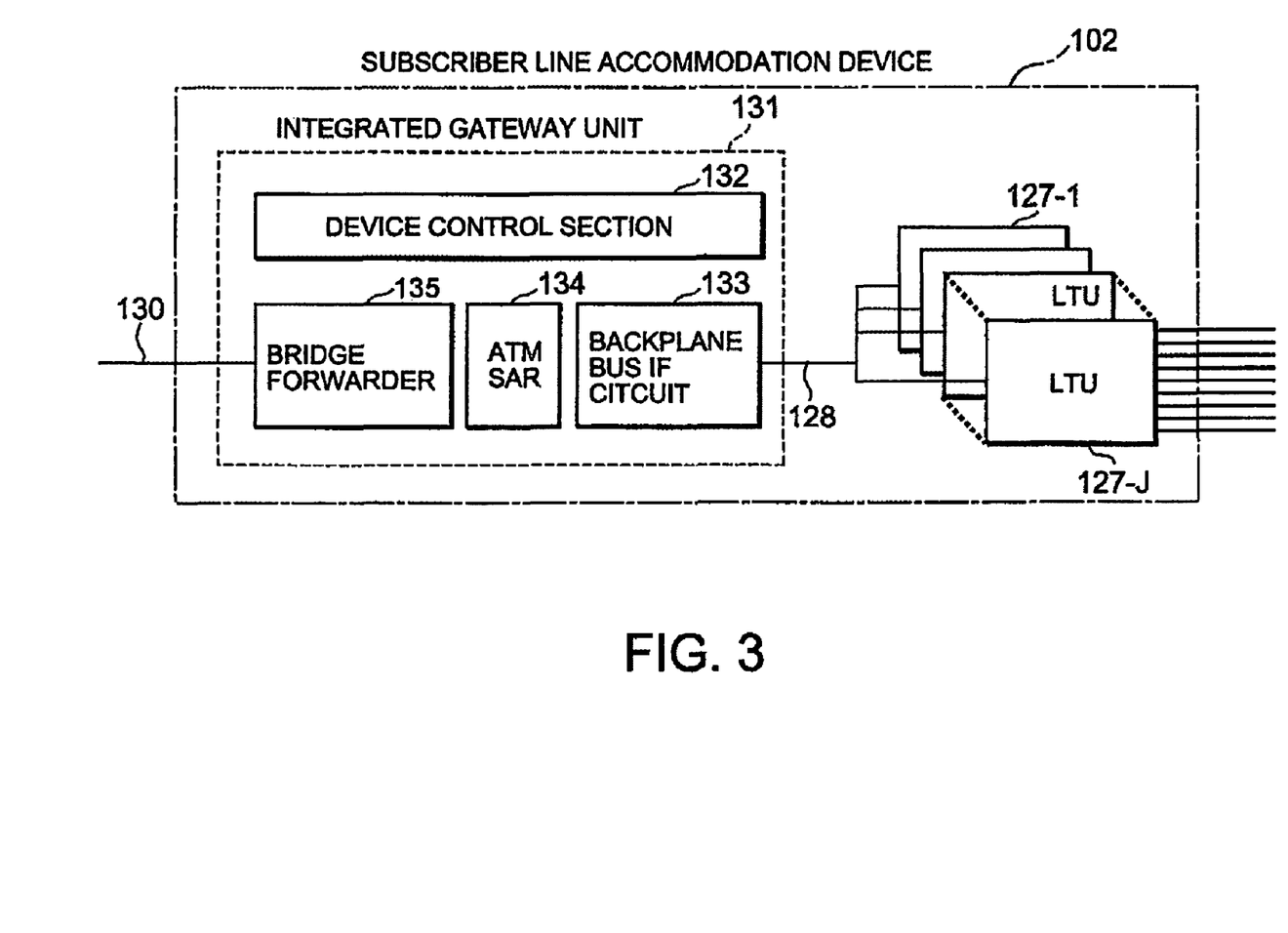
FIG. 3 is a block diagram showing a system configuration of the main part of the subscriber line accommodation device according to the embodiment of this invention.

FIG. 3 shows a system configuration of the main part of the subscriber line accommodation device 102. The subscriber line accommodation device 102 comprises the LTUs 127-1 to 127-J described referring to FIG. 2, which are connected to one end side of an integrated gateway unit 131 via a backplane bus 128. The integrated gateway unit 131 has an Interface function for connection to the Internet and is connected, at its other end side, to the uplink line 130.

The integrated gateway unit 131 comprises a device control section 132 that performs the whole control and monitoring of the subscriber line accommodation device 102, and a backplane bus IF (Interface) circuit 133 serving as an interface for a backplane. The integrated gateway unit 131 further comprises an ATM SAR (Asynchronous Transfer Mode Segmentation and Reassembly) 134 that carries out segmentation and reassembly of ATM cells, and the bridge forwarder 135 that performs forwarding of Layer 2 frames and classifies packets based on MAC addresses. The ATM cells are transmitted between the ATM SAR 134 and the LTUs 127-1 to 127-J, while Ethernet (registered trademark) frames are transmitted at input and output portions of the uplink line 130.

Figure 4:
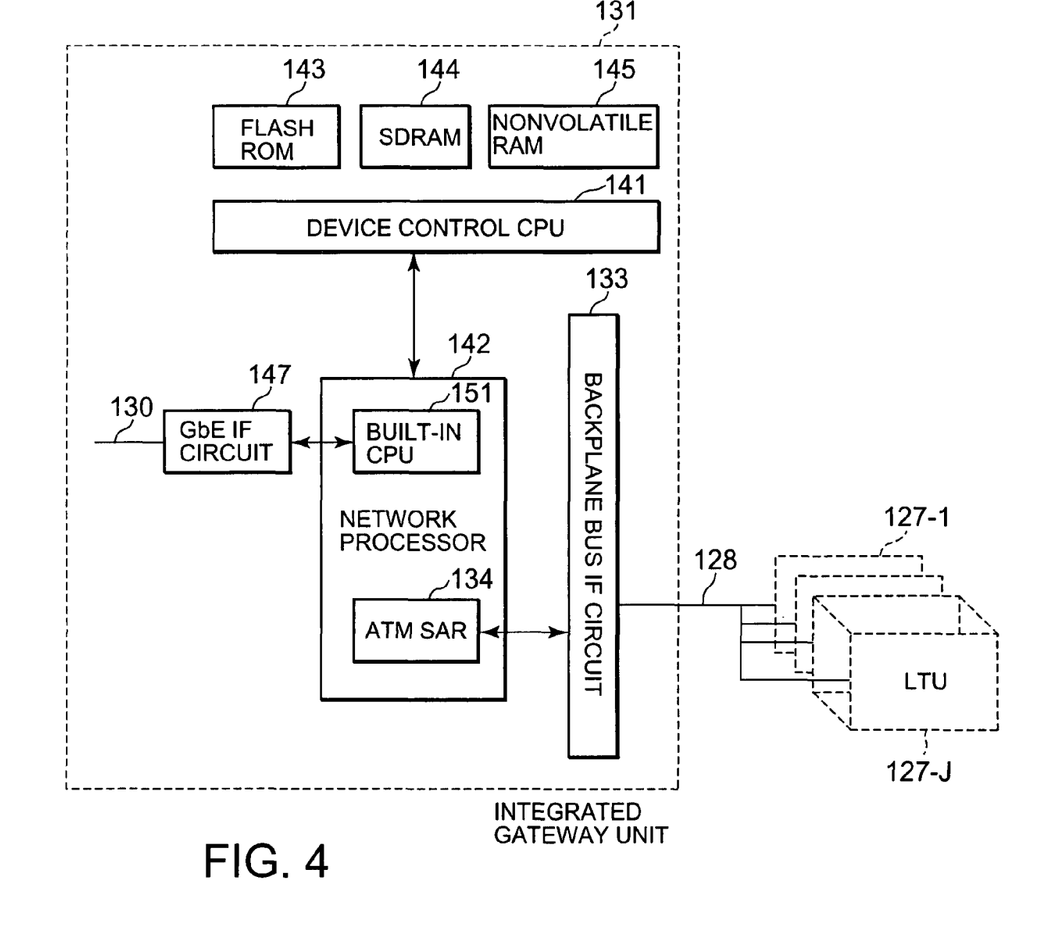
FIG. 4 is a block diagram showing an outline of a hardware configuration of an integrated gateway unit according to the embodiment of this invention.

FIG. 4 shows an outline of a circuit configuration of the integrated gateway unit 131. The integrated gateway unit 131 comprises two processors, i.e. a device control CPU (Central Processing Unit) 141 and a network processor 142, and a memory group having a flash ROM (Read Only Memory) 143, an SDRAM (Synchronous Dynamic Random Access Memory) 144, and a nonvolatile RAM (Random Access Memory) 145. The integrated gateway unit 131 further comprises the backplane bus IF circuit 133 formed by an ASIC (Application Specific Integrated Circuit) as a dedicated integrated circuit, and a GbE (Gigabit Ethernet (registered trademark)) IF (Interface) circuit 147 formed by an LSI (Large Scale Integration) chip (not illustrated).

The device control CPU 141 executes a control with respect to management, communication, and setting of configuration of the device. The network processor 142 is a high-speed communication processor comprising a built-in CPU 151 and the ATM SAR 134. The bridge forwarder 135 shown in FIG. 3 is created in a software manner by the use of the network processor 142 and carries out processing such as reception of frames, discrimination of destinations, and forwarding to the destinations. The backplane bus IF circuit 133 is created by hardware and executes various controls about the lines such as a control of buses with respect to the lines for carrying out high-speed processing of frames transmitted at gigabit speed. The backplane bus IF circuit 133 processes the LTUs 127-1 to 127-J individually by polling.

Figure 5:
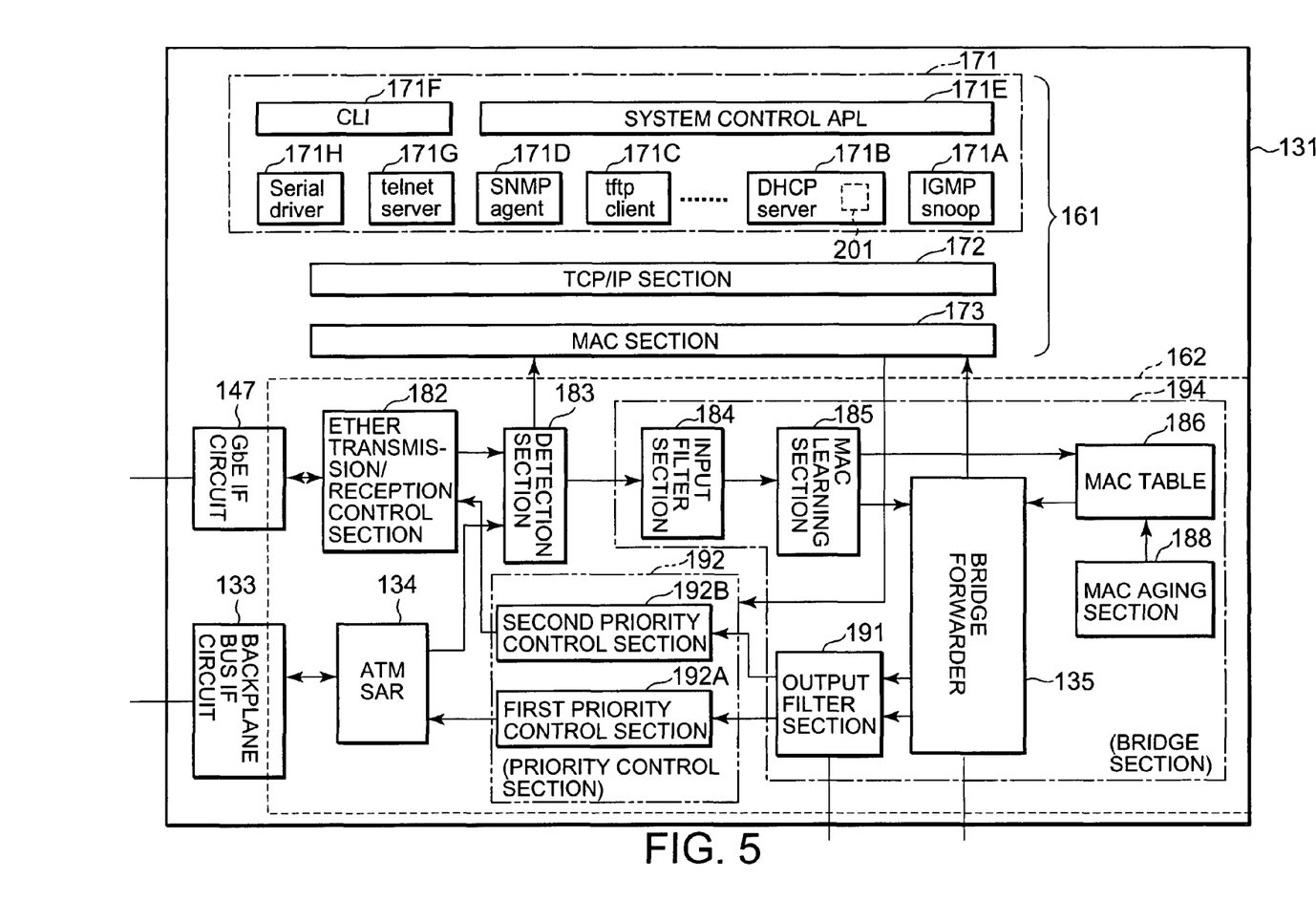
FIG. 5 is a block diagram showing an outline of a software configuration of the integrated gateway unit according to the embodiment of this invention.

FIG. 5 shows main functional blocks of the integrated gateway unit 131. The integrated gateway unit 131 comprises a basic functional section 161 created by the device control CPU 141 and its associated hardware in FIG. 4, and a signal processing section 162. The signal processing section 162 is created in a software manner by the use of the network processor 142 and its associated hardware in FIG. 4 and a control program. Naturally, the signal processing section 162 may also be created only by hardware.

In this embodiment, the basic functional section 161 comprises a functional software section 171 that performs processing such as communicating with a host (not illustrated) to operate a console (not illustrated), a TCP/IP (Transmission Control Protocol/Internet Protocol) section 172 as a protocol for performing packet communication with the functional software section 171, and an MAC section 173 that manages an MAC (Media Access Control).

In this embodiment, the functional software section 171 includes an IGMP (Internet Group Management Protocol) snoop section 171A that snoops multicast communication, and a DHCP (Dynamic Host Configuration Protocol) server 171B that automatically performs dynamic allocation of IP (Internet Protocol) addresses reusable in an IP network and various setting. The functional software section 171 further includes a tftp (trivial file transfer protocol) client 171C, an SNMP (Simple Network Management Protocol) agent 171D for device monitoring, and a system control application (APL) 171E. The functional software section 171 further includes a CLI (Command Line Interface) section 171F, a virtual terminal protocol (TELNET) server 171G, and a serial driver 171H. The DHCP server 171 is provided with a DHCP management table 201 that manages the IP addresses. Among these components, a detailed description will be given later of the components that are particularly necessary for describing this invention.

The signal processing section 162 comprises an Ether transmission/reception control section 182 that performs transmission and reception of frames on the Ethernet (registered trademark) between itself and the GbE IF circuit 147. Packets received from, for example, a program distribution server 116 (FIG. 1) via the uplink line 130 shown in FIG. 3 and the Ether transmission/reception control section 182 and packets received from the LTUs 127-1 to 127-J via the backplane bus IF circuit 133 and the ATM SAR 134 in FIG. 4 are sent to a detection section 183 where a forwarding destination of each packet is sorted into the MAC section 173 or an input filter section 184. A packet carrying an IGMP control message, an IP packet carrying a DHCP protocol message, and an IP packet directed to an IP address of the basic functional section 161 are forwarded to the MAC section 173.

The input filter section 184 serves to block, for example, an illegally accessed Layer 2 frame or Layer 3 packet. The input filter section 184 compares a forwarded packet with a condition registered in advance and discards a packet not agreeing with the condition registered and passes a packet agreeing with the condition registered. The packet having passed through the input filter section 184 is delivered to an MAC learning section 185. The MAC learning section 185 learns sender MAC addresses of respective received packets and logical port numbers having received the packets and registers these results in an MAC table 186. Then, the packet is delivered to the bridge forwarder 135. The bridge forwarder 135 extracts a destination MAC address from the packet and searches the MAC table 186 to retrieve which of logical ports is connected to the extracted destination MAC address. Even if a transfer destination of a packet to be relayed cannot be found at the beginning to thereby send the packet to all logical ports other than a logical port having received the packet, it becomes possible to transfer the received packet to the logical port by distinguishing the logical port that is connected to the destination to be transferred by the use of the destination address information in the frame as a key, through such learning of the combinations of the sender MAC address and the logical port.

An MAC aging section 188 is connected to the MAC table 186. Even in case of an MAC address stored in the MAC table 186 as a result of the learning, unless the same address is relearned within a preset time, the MAC aging section 188 deletes it from the MAC table 186 as determining that an effective time is over.

The bridge forwarder 135 formed as a Layer 2 forwarder is connected to the MAC learning section 185, the MAC table 186, an output filter section 191, and the MAC section 173. The output filter section 191 corresponds to the input filter section 184. After identifying an output logical port corresponding to a destination, the output filter section 191 discards an inappropriate packet without sending it out In the process of controlling discarding or passing of a frame matching a filtering condition set for the identified output logical port. The conditions used by the output filter section 191 for such filtering are preset by a network manager according to protocols, IP addresses, MAC addresses, input/output logical ports, or the like.

On the output side of the output filter section 191 is disposed a priority control section 192 comprising a first priority control section 192A and a second priority control section 192B. The priority control section 192 executes a control of forwarding a particular packet carrying voice or the like which requires real-time transmission, preferentially to other packets. For this control, there exist a priority control that gives priority to a protocol and a priority control that gives priority to an address of a particular destination. A frame heading toward the LTUs 127-1 to 127-J (FIG. 2) via the first priority control section 192A is forwarded to the ATM SAR 134. The ATM SAR 134 converts the frame on the Ethernet (registered trademark) into ATM cells and sends them to the LTUs 127-1 to 127-J via the backplane bus IF circuit 133. On the other hand, a frame heading toward the uplink line 130 (FIG. 2) via the second priority control section 192B is forwarded to the Ether transmission/reception control section 182. The frame input into the Ether transmission/reception control section 182 is input into the GbE IF circuit 147 as it is, i.e. in the form of the frame.

In FIG. 5, the DHCP server 171B serves as an IP address allocating section and a filter condition registering section both of which are claimed in claim 2. The input filter section 184 serves as a packet communication allowing section claimed in claim 2.

<Filtering Process>

Figure 6:
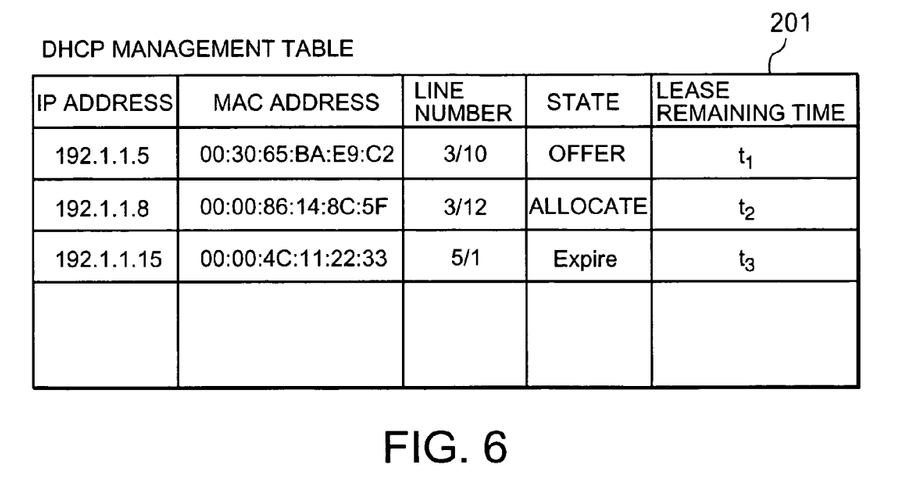
FIG. 6 is an explanatory diagram showing part of a DHCP management table provided in a DHCP server according to the embodiment of this invention.

FIG. 6 shows part of a DHCP management table 201 provided in the DHCP server 171B and used for managing allocation of IP address information. In the DHCP management table 201 shown in FIG. 6, there are described an IP address allocated by the DHCP server 171B, an MAC address of a requester user terminal, a line number, a state, and a lease remaining time. In the line number "X/Y", "X" represents a number identifying a corresponding one of the DSL subscriber lines 103-1 to 103-M shown in FIG. 1, and "Y" represents a logical port thereof. When physical ports and logical ports are in one-to-one correspondence with each other, since each physical port has the single logical port, it is not necessary to describe numbers of the logical ports in a communication system thus configured. In the case of using the ATM virtual channel (VC), the numbers of the logical ports are used.

In a column showing the state, one of "OFFER", "ALLOCATE", and "Expire" is described. "OFFER" represents the state where one of IP addresses possessed by the DHCP server 171B has been presented to a requester user terminal. "ALLOCATE" represents the state where allocation of an IP address has been fixed by acceptance of a requester user terminal to use the IP address in response to the presentation of the IP address. In this state, the user terminal can use the allocated IP address. "Expire" represents the state where a usable time of an allocated IF address has expired. This management is implemented based on time information described in a column of the lease remaining time. In the case where the lease remaining time is set to, for example, 24 hours, "Expire" is indicated at a time instant when the time has elapsed unless there is a request for an extension of time before arrival of the time from the start of lease. Thereafter, upon completion of processing to prohibit passing of a packet with respect to the IP address indicated as "Expire" and its associated information, the pertinent described information is deleted from the DHCP management table 201.

Figure 7:
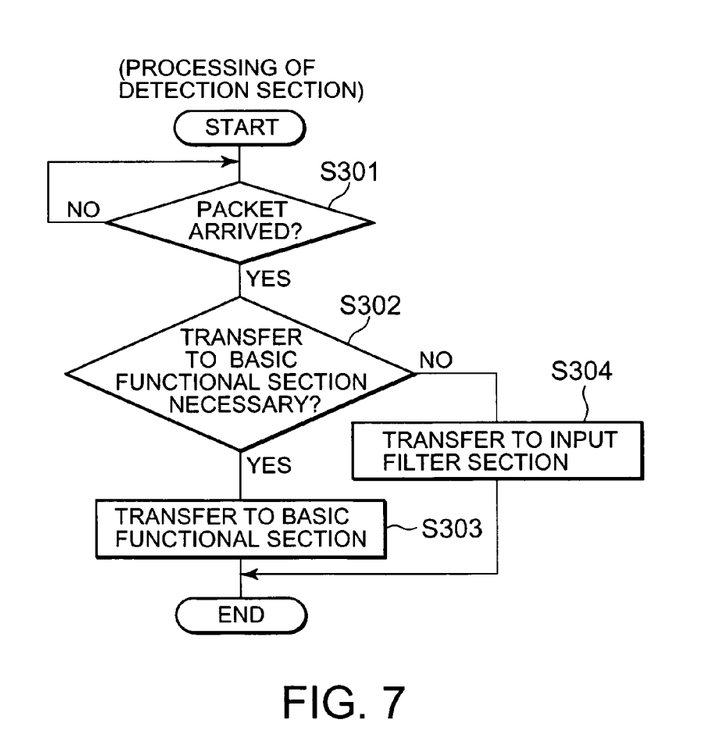
FIG. 7 is a diagram showing the flow of processing of a detection section according to the embodiment of this invention.

FIG. 7 shows processing of the detection section 183 in the filtering process reflecting the DHCP management table 201. When the detection section 183 in the integrated gateway unit 131 shown in FIG. 5 has received a packet from the Ether transmission/reception control section 182 (step S301: Y), it checks whether or not the received packet should be transferred to the basic functional section 161 (step S302). Then, when it is a prescribed packet such as a packet requesting allocation of an IP address (step S302: Y), the packet is transferred to the basic functional section 161 (step S303). In the case of the packet requesting the allocation of the IP address, the packet transferred to the basic functional section 161 is sent to the DHCP server 171B. When the packet is judged to be other than a packet to be transferred to the basic functional section 161 in step S302 (step S302: N), the packet is sent to the input filter section 184 (step S304).

Figure 8:
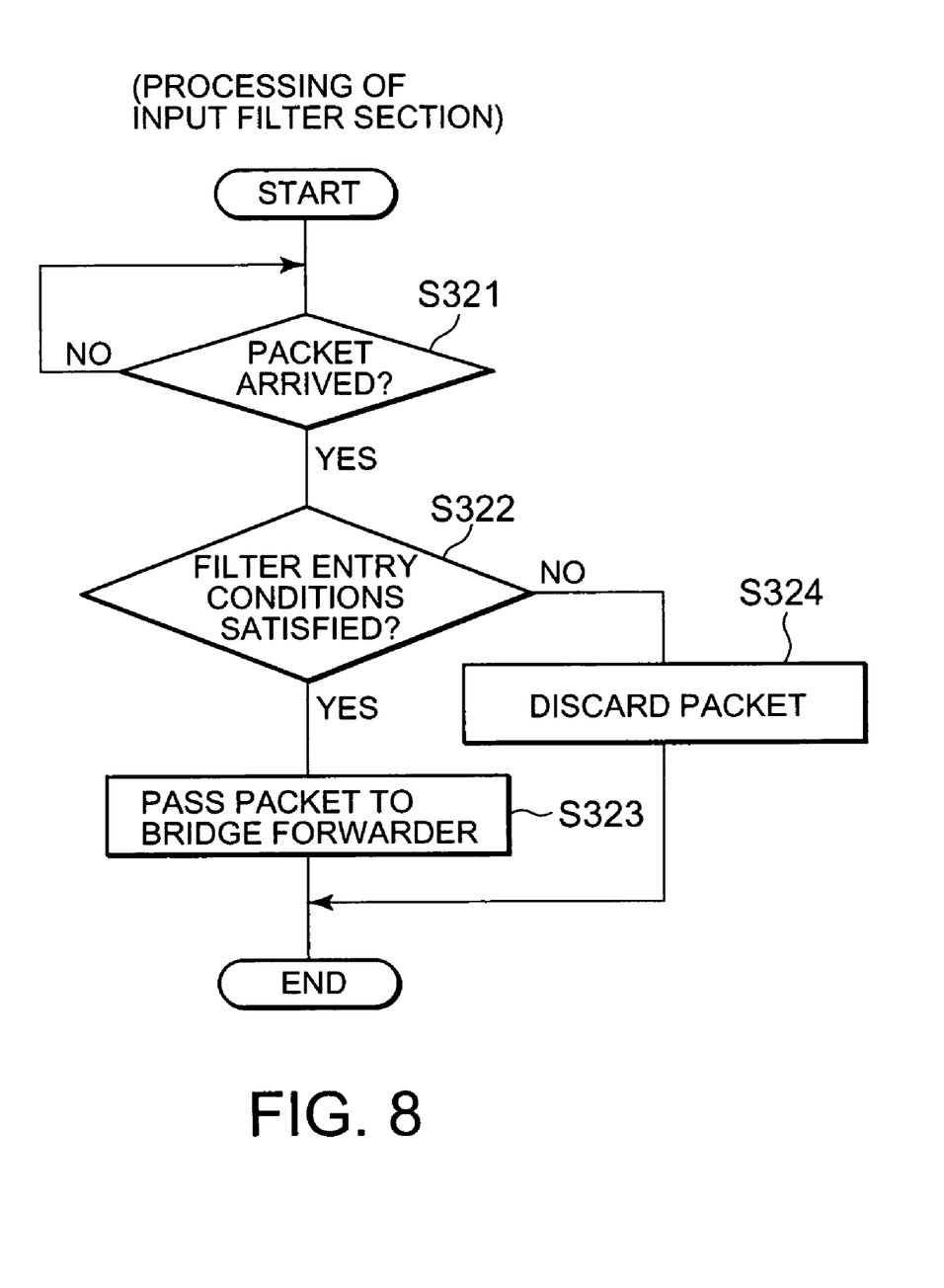
FIG. 8 is a diagram showing the flow of processing of an input filter section according to the embodiment of this invention.

FIG. 8 shows the flow of processing of the input filter section 184 in the filtering process. In response to arrival of the packet (step S321: Y), the input filter section 184 judges whether or not the packet satisfies all conditions of a filter entry which will be described later (step S322). When all conditions of the filter entry are satisfied (step S322: Y), the input filter section 184 passes the packet as it is and sends it to the bridge forwarder 135 where the foregoing processing is carried out (step S323).

On the other hand, when the packet does not satisfy at least one of the conditions of the filter entry (step S322: N), the input filter section 184 discards the packet (step S324).

Figure 9:
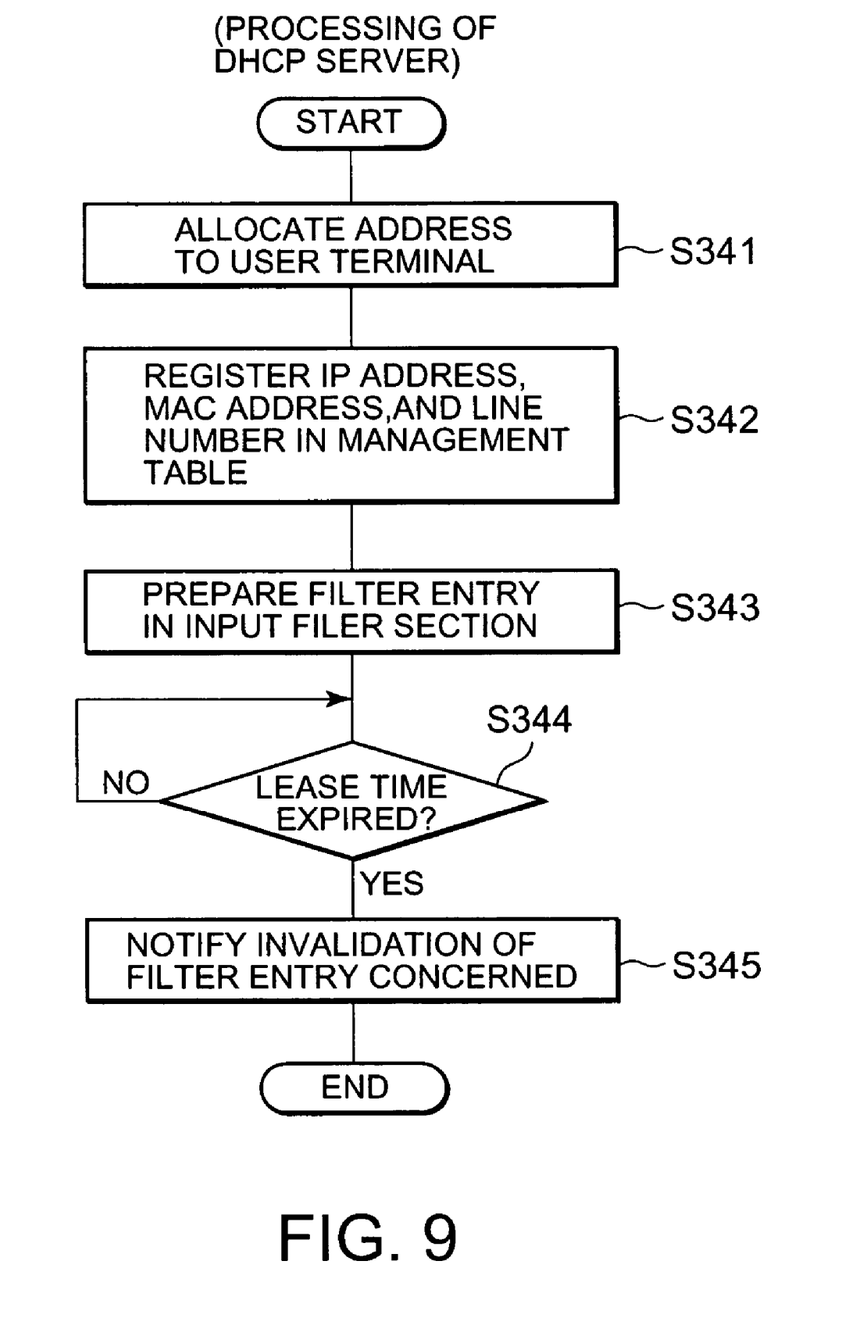
FIG. 9 is a diagram showing the flow of processing of a DHCP server according to the embodiment of this Invention.

FIG. 9 shows the flow of processing of the DHCP server 171B. In response to arrival of the packet requesting the allocation of the IP address, the DHCP server 171B performs a predetermined procedure between itself and a sender user terminal using packets and allocates an IP address to the user terminal from among IP addresses prepared in advance (step S341). Then, the DHCP server 171B registers the allocated IP address, an MAC address of the allocated user terminal, and a line number of this user terminal in the DHCP management table 201 (step S342). Then, the DHCP server 171B feeds these information to the input filter section 184 having jurisdiction over packets sent from this line to thereby cause the input filter section 184 to prepare a filter entry that allows passing of only such a packet in which a packet sender IP address, a packet sender MAC address, and a packet reception line number all agree to the registered ones (step S343).

Therefore, when the IP address, the MAC address, and the line number of a packet sent thereafter all agree to the conditions given in the filter entry, the input filter section 184 passes the packet and sends it toward the bridge forwarder 135 as described in FIG. 8.

On the other hand, the DHCP server 171B allocates IP addresses to user terminals by setting lease times, respectively. Therefore, a lease remaining time T up to the expiration of the lease time continues to be monitored per IP address (step S344). When there is any lease remaining time T that becomes "0" in step S344 (step S344: Y), the DHCP server 171B performs a corresponding registration process in the DHCP management table 201 and then notifies the input filter section 184 that the filter entry concerned has been invalidated (step S345). Accordingly, a packet that is sent after the lapse of the lease time Is discarded by the Input filter section 184.

As described above, in this embodiment, the input filter section 184 implements the filtering process of registering not only an IP address and an MAC address, but also a physical interface number of a corresponding one of the LTUs 127-1 to 127-J (FIG. 2) and passing only such a packet in which all of these three agree to the registered ones. Therefore, even if a third party attempts to obtain an IP address using a different line and the same MAC address, since a physical interface number does not agree, a packet concerned does not pass through the input filter section 184 and is discarded. In addition, since this filter condition is a dynamic filter that allows passing of a packet therethrough only in a period when the DHCP server 171B leases the IP address, the security against illegal access is further enhanced.

In the embodiment as described above, the condition of filtering is set such that an IP address, an MAC address, and a line number of a sent packet all agree to registered information. However, even when a pair of an IP address and a line number or a logical port is set as a condition of filtering, it is possible to prevent illegal access from a different line or a different logical port.

Particularly, in the case of a transmission line such as a telephone line or an optical fiber cable accommodating a plurality of lines, it is practically difficult for a third party to identify a line of a user terminal concerned on the midway of the transmission line between the subscriber line accommodation device 102 and the user terminal and access a communication network using the identified line. Further, the communication components such as the LTUs 127-1 to 127-J and the splitter units 122-1 to 122-1920 shown in FIG. 2 are disposed in the subscriber line accommodating device 102, i.e. in a place where the physical security Is high, such as a telephone exchange where outsiders can be easily excluded. Therefore, it is possible to effectively prevent illegal access by a third party using a specific line.

The foregoing subscriber line accommodation device according to the embodiment of this Invention can be summarized as follows. That is, the subscriber line accommodation device comprises a subscriber line termination section that terminates a plurality of subscriber lines individually, an IP address allocating section that, when a communication terminal of any of the plurality of subscriber lines terminated by the subscriber line termination section has made a request for acquisition of an IP address that is given to a packet when performing packet communication, allocates an IP address to the communication terminal by limiting a usable time, a filter condition registering section that registers a set of the IP address allocated by the IP address allocating section, an identification number of the subscriber line having made the request for acquisition of the IP address, and an MAC address as unique information of the communication terminal having made the request for acquisition of the IP address, and a packet communication allowing section that allows packet communication only for a packet in which a set of an IP address, an identification number, and an MAC address agree to the set thereof registered in the filter condition registering section.

As another embodiment of this invention, normal address information may be used Instead of an IP address. In this case, a subscriber line accommodation device according to this another embodiment is configured as follows. The subscriber line accommodation device comprises a subscriber line termination section that terminates a plurality of subscriber lines individually, an address information allocating section, a filter condition registering section, and a packet communication allowing section. When a communication terminal of any of the plurality of subscriber lines terminated by the subscriber line termination section has made a request for acquisition of own-station address information that is given to a packet when performing packet communication, the address information allocating section allocates own-station address information to the communication terminal by limiting a usable time. The filter condition registering section registers a pair of the own-station address information allocated by the address information allocating section and an identification number of the subscriber line having made the request for acquisition of the own-station address information. The packet communication allowing section allows packet communication only for a packet in which a pair of own-station address information and an identification number agree to the pair thereof registered in the filter condition registering section.

As a packet filtering method applied to the foregoing another embodiment, the following method is provided, This packet filtering method executes an address information allocating step of, when a communication terminal of any of a plurality of subscriber lines has made a request for acquisition of own-station address information that is given to a packet when performing packet communication, allocating own-station address information to the communication terminal by limiting a usable time, a filter condition registering step of, when the address Information allocating step has allocated the own-station address information, registering a pair of the own-station address information and an identification number of the subscriber line having made the request for acquisition of the own-station address information, along with the usable time, and a packet communication allowing step of, when a packet has arrived, allowing packet communication only for such a packet that agrees to the pair of the own-station address information within the usable time and the identification number of the subscriber line having made the request for acquisition of the own-station address information.

In each of the foregoing embodiments, an identification number of a subscriber line is a number of a physical line or a number of a virtual logical communication channel that is set on the physical line. Further, the subscriber line may be a line using an optical fiber cable.

As described above, according to this invention, when an IP address (or own-station address information) is allocated to a communication terminal that has made a request for acquisition of an IP address (or own-station address information) of a packet, an identification number of a subscriber line having made such a request is also registered. Therefore, even if illegal access is attempted from a subscriber line different therefrom, it can be securely rejected. Further, since a usable time is set to an allocated IP address (or own-station address information), an IP address (or own-station address information) is not fixed even for the same communication terminal and therefore illegal access can be prevented further effectively.

What is claimed is:

1. A subscriber line accommodation device comprising:
   a subscriber line termination section that terminates a plurality of subscriber lines individually;
   an address information allocating section that, when a communication terminal of any of the plurality of subscriber lines terminated by said subscriber line termination section has made a request for acquisition of own-station address information that is given to a packet when performing packet communication, allocates own-station address information to said communication terminal by limiting a usable time;
   a filter condition registering section that registers a pair of the own-station address information allocated by said address information allocating section and an identification number of the subscriber line having made said request for acquisition of the own-station address information;
   a learning section configured to learn a sender address of a received packet, learn a logical port number having received the packet and register the learned sender address and logical port number in a table;
   a bridge forwarder, configured to extract a destination address from the packet and search the table to identify a logical port that is connected to the destination address; and
   a packet communication allowing section that allows packet communication only for the packet in which a pair of own-station address information and an identification number agree to the pair thereof registered in said filter condition registering section.

2. A subscriber line accommodation device comprising:
   a subscriber line termination section that terminates a plurality of subscriber lines individually;
   an IP address allocating section that, when a communication terminal of any of the plurality of subscriber lines terminated by said subscriber line termination section has made a request for acquisition of an IP address that is given to a packet when performing packet communication, allocates an IP address to said communication terminal by limiting a usable time;
   a filter condition registering section that registers a set of the IP address allocated by said IP address allocating section, an identification number of the subscriber line having made said request for acquisition of the IP address, and an MAC address as unique information of the communication terminal having made said request for acquisition of the IP address;
   a MAC learning section configured to learn a sender's MAC address of a received packet, learn a logical port number having received the packet and register the learned sender MAC address and logical port number in a MAC table;
   a bridge forwarder, configured to extract a destination MAC address from the packet and search the table to identify a logical port that is connected to the destination MAC address; and
   a packet communication allowing section that allows packet communication only for the packet in which a set of an IP address, an identification number, and an MAC address agree to the set thereof registered in said filter condition registering section.

3. A subscriber line accommodation device according to claim 1, wherein said packet communication allowing section discards a packet not agreeing to said pair registered in said filter condition registering section except when making a request for acquisition of the own-station address information.

4. A subscriber line accommodation device according to claim 2, wherein said packet communication allowing section discards a packet not agreeing to said set registered in said filter condition registering section except when making a request for acquisition of the IP address.

5. A subscriber line accommodation device according to claim 1, wherein said packet communication allowing section discards a packet of which said usable time has expired except when making a request for acquisition of the own-station address information.

6. A subscriber line accommodation device according to claim 2, wherein said packet communication allowing section discards a packet of which said usable time has expired except when making a request for acquisition of the IP address.

7. A subscriber line accommodation device according to claim 1 or 2, wherein the identification number of the subscriber line is a number of a physical line or a number of a virtual logical communication channel that is set on the physical line.

8. A subscriber line accommodation device according to claim 1 or 2, wherein the subscriber line is a DSL line.

9. A subscriber line accommodation device according to claim 1 or 2, wherein the subscriber line is a line using an optical fiber cable.

10. A subscriber line accommodation device according to claim 1, wherein said address information allocating section is a DHCP server.

11. A subscriber line accommodation device according to claim 2, wherein said IP address allocating section Is a DHCP server.

12. A packet filtering method comprising:
    an address information allocating step of, when a communication terminal of any of a plurality of subscriber lines has made a request for acquisition of own-station address information that is given to a packet when performing packet communication, allocating own-station address information to said communication terminal by limiting a usable time;
    a filter condition registering step of, when said address information allocating step has allocated the own-station address information, registering a pair of said own-station address information and an identification number of the subscriber line having made said request for acquisition of the own-station address information, along with said usable time;
    a learning step of learning a sender address of a received packet, learning a logical port number having received the packet and registering the learned sender address and logical port number in a table;
    a bridge forwarding step of, extracting a destination address from the packet and searching the table to identify a logical port that is connected to the destination address; and
    a packet communication allowing step of, when the packet has arrived, allowing packet communication only for such a packet that agrees to the pair of the own-station address information within said usable time and the identification number of the subscriber line having made said request for acquisition of the own-station address information.

13. A packet filtering method comprising:
    an IP address allocating step of, when a communication terminal of any of a plurality of subscriber lines has made a request for acquisition of an IP address that is given to a packet when performing packet communication, allocating an IP address to said communication terminal by limiting a usable time;

a filter condition registering step of, when said IP address allocating step has allocated the IP address, registering a set of said IP address, an identification number of the subscriber line having made said request for acquisition of the IP address, and an MAC address as unique information of the communication terminal having made said request for acquisition of the IP address, along with said usable time; and a MAC learning step of learning a sender's MAC address of a received packet, learning a logical port number having received the packet and registering the learned sender MAC address and logical port number in a MAC table;

a bridge forwarding step of, extracting a destination MAC address from the packet and searching the table to identify a logical port that is connected to the destination MAC address; and a packet communication allowing step of, when a packet has arrived, allowing packet communication only for such a packet that agrees to the set of the IP address within said usable time, the identification number, and the MAC address.

* * * * *